(12) United States Patent
Ishida et al.

(10) Patent No.: US 7,051,348 B2
(45) Date of Patent: May 23, 2006

(54) OPTICAL INFORMATION RECORDING MEDIUM INCLUDING A SUBSTRATE, A RECORDING LAYER, A LAYER OF ACRYLIC ADHESIVE, AND A COVER LAYER

(75) Inventors: Toshio Ishida, Kanagawa (JP); Shinji Saito, Kanagawa (JP); Takeshi Kakuta, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/329,757

(22) Filed: Dec. 27, 2002

(65) Prior Publication Data

US 2003/0179694 A1 Sep. 25, 2003

(30) Foreign Application Priority Data

Dec. 28, 2001 (JP) .............................. 2001-399524

(51) Int. Cl.
*G11B 7/24* (2006.01)
*G11B 23/03* (2006.01)

(52) U.S. Cl. .................................................... 720/719
(58) Field of Classification Search ............... 428/64.6, 428/64.4; 369/288; 720/719, 718
See application file for complete search history.

(56) References Cited

U.S. PATENT DOCUMENTS

| | | | | |
|---|---|---|---|---|
| 4,981,743 A | * | 1/1991 | Ho | 428/65.1 |
| 5,020,048 A | * | 5/1991 | Arai et al. | 369/291 |
| 5,051,314 A | * | 9/1991 | Ichikawa et al. | 428/522 |
| 6,262,969 B1 | * | 7/2001 | Ito et al. | 369/91 |
| 6,811,850 B1 | | 11/2004 | Hirata | 428/64.2 |
| 2001/0053122 A1 | * | 12/2001 | Yukumoto et al. | 369/286 |
| 2002/0001691 A1 | * | 1/2002 | Sabi et al. | 428/64.4 |
| 2003/0099185 A1 | * | 5/2003 | Nakamura et al. | 369/275.2 |

FOREIGN PATENT DOCUMENTS

JP 2001-43566 2/2001

* cited by examiner

*Primary Examiner*—Julie Anne Watko
(74) *Attorney, Agent, or Firm*—Sughrue Mion, PLLC

(57) ABSTRACT

The invention provides an optical information recording medium, for use with a laser irradiating a laser beam having a wavelength of 380 to 500 nm through an objective lens with a numerical aperture of at least 0.7, the optical information recording medium comprising, in the following order: a substrate; a recording layer; a layer of acrylic adhesive; and a cover layer. A light reflecting layer may be provided between the substrate and the recording layer. Also a cover layer formed by an acrylic adhesive material may be provided instead of the layer of the acrylic adhesive material and the cover layer.

17 Claims, No Drawings

OPTICAL INFORMATION RECORDING MEDIUM INCLUDING A SUBSTRATE, A RECORDING LAYER, A LAYER OF ACRYLIC ADHESIVE, AND A COVER LAYER

BACKGROUND OF THE INVENTION

1. Field of the Invention

The present invention relates to an optical information recording medium, and particularly to a re-writable optical information recording medium, which is recordable with heat mode.

2. Description of the Related Art

With the start of BS digital broadcasting with an image quality of high definition television (HDTV) approaching, development of a high-capacity information recording medium, which is capable of recording the BS digital broadcasting of HDTV quality for about two hours, is now under way. In an optical information recording medium for a blue-violet laser light source, which recording medium is expected to be prevalent as a next-generation optical disk, a recording layer formed on a substrate is covered with a thin cover layer having a thickness of 0.1 to 0.3 mm. In a system employing such an optical information recording medium, a pickup employs an objective lens having a high numerical aperture (NA) to focus a laser beam and the recording is performed by irradiating the optical disk from the thin cover layer side thereof with the laser beam. Thus a high recording capacity per-side of 22.5 Gbyte is being realized.

The recording layer of the optical information recording medium is covered with a cover layer as explained above, and the cover layer is provided on the recording layer via an adhesive. Examples of methods for providing the cover layer generally include, for example, a method of spin coating a substrate with an ultraviolet-curable adhesive and sticking the cover layer thereon, and a method of coating a substrate with an adhesive to provide the cover layer thereabove.

Among these two methods, the method utilizing the coating of the adhesive is advantageous because it forms optical information disks having a smaller fluctuation of the thickness between the internal periphery and the external periphery but results in a higher level of noises, in comparison with the method of spin coating a substrate with the ultraviolet-curable adhesive and sticking the cover layer thereon.

SUMMARY OF THE INVENTION

The present inventors, as a result of intensive investigations to overcome the above-mentioned drawbacks, have found that, when a rubber adhesive is employed as the adhesive, small irregularities tend to be formed, and these irregularities are the cause of noise, and the present invention has thus been made.

Therefore, the object of the invention is to provide an optical information recording medium with a low noise level and with excellent recording characteristics.

The first aspect of the invention provides an optical information recording medium, for use with a laser irradiating a laser beam having a wavelength of 380 to 500 nm through an objective lens with a numerical aperture of at least 0.7, the optical information recording medium comprising, in the following order: a substrate; a recording layer; a layer of acrylic adhesive; and a cover layer.

The second aspect of the invention provides an optical information recording medium, for use with a laser irradiating a laser beam having a wavelength of 380 to 500 nm through an objective lens with a numerical aperture of at least 0.7, the optical information recording medium comprising, in the following order: a substrate; a recording layer; and a cover layer formed by an acrylic adhesive.

The third aspect of the invention provides an optical information recording medium, for use with a laser irradiating a laser beam having a wavelength of 380 to 500 nm through an objective lens with a numerical aperture of at least 0.7, the optical information recording medium comprising, in the following order: a substrate; a light reflecting layer; a recording layer; a layer of acrylic adhesive; and a cover layer.

DETAILED DESCRIPTION OF THE PREFERRED EMBODIMENTS

The optical information recording medium of the present invention has a substrate, a light reflecting layer (if necessary), a recording layer, and a cover layer in this order. The optical information recording medium will be how explained in detail, with explanation on each layer.
<<Optical Information Recording Medium>>
<1. Substrate>

For the substrate, there can be arbitrarily selected various materials employed currently in the substrate of the optical information recording media.

Specific examples of the material include glass; an acrylic resin such as polycarbonate or polymethyl methacrylate; a vinyl chloride resin such as polyvinyl chloride or a vinyl chloride copolymer; an epoxy resin; an amophous polyolefin; a polyester; and a metal such as aluminum, and these materials may be used alone or in combination if desired.

Among these materials, in consideration of the moisture resistance, the dimensional stability and the inexpensiveness, amorphous polyolefin or polycarbonate is preferable and polycarbonate is particularly preferable. The thickness of the substrate is preferably 1.1±0.3 mm.

Tracking guide grooves or irregularities (pregrooves) representing information such as an address signal are formed on the substrate. In order to achieve a higher recording density, it is preferable to use a substrate having pregrooves of a smaller track pitch than in a CD-R or a DVD-R. The pregrooves have a track pitch preferably in a range of 200 to 400 nm, and more preferably 250 to 350 nm. The pregrooves preferably have a depth (groove depth) within a range of 20 to 150 nm, and more preferably 50 to 100 nm.

An undercoat layer is preferably formed on a surface of the substrate on which surface a light reflecting layer explained later is provided for the purpose of improving flatness and adhesive power.

Examples of the material for the undercoat layer include a polymer such as polymethyl methacrylate, an acrylic acid-methacrylic acid copolymer, a styrene-maleic anhydride copolymer, polyvinyl alcohol, N-methylolacrylamide, a styrene-vinyltoluene copolymer, chlorosulfonated polyethylene, nitrocellulose, polyvinyl chloride, chlorinated polyolefin, polyester, polyimide, a vinyl acetate-vinyl chloride copolymer, an ethylene-vinyl acetate copolymer, polyethylene, polypropylene and polycarbonate; and a surface modifying agent such as a silane coupling agent.

The undercoat layer can be formed by dissolving or dispersing the above-mentioned material in a suitable solvent to obtain a coating solution, and coating the surface of the substrate with such a coating solution by a coating method such as spin coating, dip coating or extrusion coating. The undercoat layer has a thickness generally within a range of 0.005 to 20 μm, and preferably within a range of 0.01 to 10 μm.

<2. Light Reflecting Layer>

The light reflecting layer employs a light reflecting substance having a high reflectance to the laser beam. The reflectance is preferably 70% or higher.

Examples of the light reflecting substance with a high reflectance include a metal and a semi-metal such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn or Bi, and stainless steel. These light reflecting substances may be used alone or a combination, or used as an alloy. Among these substances, Cr, Ni, Pt, Cu, Ag, Au, Al and stainless steel are preferable. Particularly preferable is Au, Ag, Al and an alloy thereof, and the most preferable is Au, Ag and an alloy thereof.

The light reflecting layer can be formed on the substrate by evaporating, sputtering or ion plating of the above-mentioned light reflecting substance. The thickness of the light reflecting layer is generally within a range of 10 to 300 nm, and preferably a range of 50 to 200 nm.

However, the light reflecting layer may be dispensed with in case where a sufficient reflectance can be obtained by the recording layer, and, in such a case, the recording layer also functions as the light reflecting layer.

<3. Recording Layer>

The recording layer is formed on the light reflecting layer, and is capable of recording information by an irradiation with a laser beam of a wavelength of 380 to 500 nm through an objective lens with a numerical aperture of 0.7 or larger.

The recording layer preferably includes a dye, and examples of the dye include a benzotriazole dye, a cyanine dye, an oxonol dye, a metal complex dye, an azo dye, and a phthalocyanine dye, and a benzotriazole dye and a phthalocyanine dye are preferable among these dyes. Also, more preferable are benzotriazole dyes described in Japanese Patent Application No. 2001-286246 and phthalocyanine dyes described in Japanese Patent Applications Nos. 2001-296958 and 2001-14740.

Dyes described in JP-A Nos. 4-74690, 8-127174, 11-53758, 11-334204, 11-334205, 11-334206, 11-334207, 2000-43423, 2000-108513 and 2000-158818 are also preferably used.

The recording layer is formed by dissolving a recording substance such as a dye, together with a binder, in a suitable solvent to prepare a coating solution, and coating the light reflecting layer formed on the substrate surface with such a coating solution to form a coating film, followed by drying. The concentration of the recording substance in the coating solution is generally within a range of 0.01 to 15 mass %, preferably 0.1 to 10 mass %, more preferably 0.5 to 5 mass % and most preferably 0.5 to 3 mass %.

Examples of the solvent for the coating solution include an ester such as butyl acetate, ethyl lactate and cellosolve acetate; a ketone such as methyl ethyl ketone, cyclohexanone and methyl isobutyl ketone; a chlorinated hydrocarbon such as dichloromethane, 1,2-dichloroethane and chloroform; an amide such as dimethylformamide; a hydrocarbon such as methylcyclohexane; an ester such as tetrahydrofuran, ethyl ether and dioxane; an alcohol such as ethanol, n-propanol, isopropanol, n-butanol and diacetone alcohol; a fluorinated solvent such as 2,2,3,3-tetrafluoropropanol; and glycol ethers such as ethylene glycol monomethyl ether, ethylene glycol monoethyl ether and propylene glycol monomethyl ether.

These solvents may be used alone or in combination, in consideration of the solubility of the recording substance to be used. The coating solution may further contain an additive such as an antioxidant, a UV absorbent, a plasticizer or a lubricant according to the purpose.

In case of using a binder, examples of the binder include a natural organic polymer substance such as gelatin, cellulose derivative, dextran, rosin and a rubber; a synthetic organic polymer such as a hydrocarbon resin (e.g. polyethylene, polypropylene, polystyrene and polyisobutylene), a vinyl resin (e.g. polyvinyl chloride, polyvinylidene chloride, and a vinyl chloride—vinyl acetate copolymer), an acrylic resin (e.g. polymethyl acrylate and polymethyl methacrylate), polyvinyl alcohol, chlorinated polyethylene, an epoxy resin, a butyral resin, a rubber derivative and an initial condensate of a thermosetting resin such as a phenol-formaldehyde resin. In case where a binder is used as one of the components of the recording layer, the amount of the binder is generally within a range of 0.01 to 50 times with respect to mass of the recording substance, and preferably within a range of 0.1 to 5 times. The concentration of the recording substance in thus prepared coating solution is generally within a range of 0.01 to 10 mass %, and preferably 0.1 to 5 mass %.

The coating can be performed by spray coating, spin coating, dip coating, roller coating, blade coating, doctor roller coating, screen printing or the like. The recording layer may be constructed as a single layer or superposed layers. The recording layer has a thickness generally within a range of 20 to 500 nm, preferably within a range of 30 to 300 nm, and more preferably within a range of 50 to 100 nm.

In order to improve the light fastness of the recording layer, the recording layer may contain an antifading agent.

For the antifading agent, a singlet oxygen quencher is generally employed. Those described in already known published references such as patent specifications are used as the singlet oxygen quencher.

Specific examples thereof include those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492, JP-B Nos. 1-38680 and 6-26028, German Patent No. 350,399 and Bulletin of Japanese Chemical Society, p.1141, Oct. 1992.

The amount of the antifading agent such as the aforementioned single oxygen quencher is usually within a range of 0.1 to 50 mass % with respect to the amount of the dye, preferably 0.5 to 45 mass %, more preferably 3 to 40 mass % and particularly preferably 5 to 25 mass %.

The recording layer can be, in addition to a recording layer including an organic compound such as a dye, a phase change recording layer for recording information by a phase change or a magnetooptical recording layer for recording information by a magnetooptical phenomenon. For example, in case of a phase change recording layer, a dielectric layer is formed for example by $ZnS—SiO_2$, and the dielectric layer is provided instead of the light transmitting layer. Also in the phase change recording layer, a metal compound such as a chalcogenide including Sb, Te, Ag and In can be used as the recording substance.

<4. Cover Layer>

The cover layer is provided in order to avoid ingress of moisture into the interior of the optical information recording medium. A material constituting the cover layer (cover sheet) is not particularly restricted as long as it is transparent, but the material is preferably a polycarbonate, a cellulose triacetate or an acrylic polymer, and more preferably has a moisture absorption rate of not more than 5% at 23° C. and 50% RH.

The term "transparent" means a transparency capable of transmitting (with a transmittance of 90 or higher) recording light and reproducing light.

The cover layer has a thickness preferably within a range of 0.01 to 0.2 mm, more preferably 0.03 to 0.1 mm and most preferably 0.05 to 0.095 mm.

The formation of the cover layer with an acrylic adhesive can be performed, for example, by coating a cover sheet with the acrylic adhesive with a roller or the like and laminating the cover sheet on the recording layer. Also depending on the type of the acrylic adhesive, the cover layer composed of the acrylic adhesive can be formed by coating the recording layer with the acrylic adhesive.

The acrylic adhesive means an adhesive including principally an acrylic polymer, and may be of a solvent type adhesive or an aqueous adhesive.

The acrylic polymer preferably has a glass transition point (Tg) of 0° C. or lower. Examples of such an acrylic polymer include a homopolymer and a copolymer of acrylic acid and an acrylic acid ester, and a homopolymer and a copolymer of methacrylic acid and a methacrylic acid ester.

The above-mentioned solvent can be suitably selected according to the polymer to be used, and can be, for example, toluene, methyl ethyl ketone, cyclohexanone or butyl acetate.

The acrylic adhesive may contain a crosslinking agent, and the crosslinking agent can be, for example, sulfur.

In case of bonding the cover layer to the recording layer with the acrylic adhesive, a layer (adhesive layer) formed by the acrylic adhesive has a thickness preferably within a range of 1 to 1000 µm, more preferably within a range of 5 to 500 µm and particularly preferably within a range of 10 to 100 µm, in order to secure elasticity.

For the purpose of viscosity control, a coating temperature of the acrylic adhesive is preferably within a range of 23 to 50° C., more preferably within a range of 24 to 40° C. and most preferably within a range of 25 to 37° C. After the coating, drying is performed preferably at 0 to 300° C., more preferably 10 to 200° C. and most preferably 15 to 150° C. Also a laminating temperature is preferably within a range of 0 to 200° C., more preferably within a range of 10 to 100° C. and most preferably within a range of 15 to 50° C.

The cover layer can be formed on the recording layer by sitcking a sheet formed by applying the adhesive to a temporarily substrate (a sheet having an adhesive layer on the temporary substrate), onto the cover sheet, peeling off the temporary substrate to provide the adhesive layer on the cover sheet, and laminating such a cover sheet onto the recording layer.

The above-mentioned sheet having the adhesive layer on the temporary substrate can be prepared by applying and drying the acrylic adhesive on the temporary substrate under the above-described conditions.

Though the above-described method of forming the cover layer is a preferable embodiment, a more preferable embodiment is a method of transferring the acrylic adhesive onto the cover sheet. More specifically, it is preferable to prepare a sheet having an adhesive layer on the temporary substrate, to transfer the adhesive layer from the sheet onto a roller or the like, to transfer the adhesive layer from the roller onto the cover sheet, and to laminate the cover sheet onto the recording layer. The laminating condition is similar to that described in the foregoing.

In case of using the sheet which has the adhesive layer on the temporary substrate, the substrate is not particularly restricted, for example can be a plastic film such as of polyethylene terephthalate, polypropylene, polyethylene and polyvinyl chloride; paper such as craft paper, woodfree paper, clay coated paper and Japanese paper; a non-woven cloth such as of rayon or polyester; a woven cloth of synthetic fibers such as polyester, nylon or an acrylic resin; and a metal foil such as of aluminum, copper or stainless steel, and a plastic film is preferable in view of uniformly applying a releasing agent on the temporary substrate in striped manner.

The releasing agent to be used can be suitably selected from already used ones such as silicone releasing agent or long-chain alkyl releasing agent.

In the above-described methods of forming the cover layer, the adhesive is provided on the cover sheet, but it may also be provided on the recording layer.

<<Information Recording Method and Information Reproducing Method Utilizing the Optical Information Recording Medium of the Invention>>

An information recording method and a method of reproducing the recorded information using the optical information recording medium of the invention will be now explained.

Information recording on the optical information recording medium is for example performed in the following manner.

At first the optical information recording medium is rotated at a constant linear velocity (1.2 to 1.4 m/sec in case of a CD format) or at a constant angular velocity, and is irradiated from the cover layer side with recording laser light. Irradiated portions of the recording layer absorb the light and causes a local rise in the temperature to generate a physical or chemical change (for example generation of a bit) and to alter the optical characteristics, thereby recording information.

A laser beam source having an oscillation wavelength of 380 to 500 nm can be, for example, a blue-violet semiconductor laser having an oscillation wavelength within a range of 390 to 415 nm, a blue-green semiconductor laser having a central oscillation wavelength of 515 nm, or a blue-violet SHG laser having a central oscillation wavelength of 425 nm and including an infrared semiconductor laser having a central oscillation wavelength of 850 nm and a wavelength conversion element (SHG) of optical wave guide type. In order to increase the recording density, it is particularly preferable to employ a blue-violet semiconductor laser or an SHG laser capable of providing a shorter wavelength. Also in order to increase the recording density, it is essential that an objective lens employed in a pickup has a numerical aperture of 0.7 or higher, preferably 0.85 or higher.

On the other hand, the recorded information can be reproduced by irradiating the optical information recording medium, while rotating the optical information recording medium at a constant linear velocity which is the same as above, with a laser beam from the cover layer side and detecting a reflected light.

EXAMPLES

The present invention will be explained in more details by following examples, but the present invention is not limited to such examples.

Example 1

An injection-molded substrate which had a thickness of 1.1 mm and a diameter of 120 mm, had a spiral groove, and was made of a polycarbonate resin (Panlite AD5503 (trade name); manufactured by Teijin Corp.) was prepared and silver was sputtered on a grooved surface of the substrate to form a light reflecting layer having a film thickness of 120 nm. The following organic substance 1 (dye) was mixed with 2,2,3,3-tetrafluoropropanol and was dissolved over 2 hours with an ultrasonic vibrator to prepare a dye coating solution:

Organic Substance 1

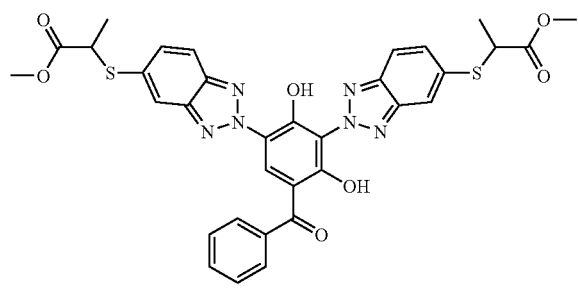

The light reflecting layer was coated with the dye coating solution by spin coating under conditions of 23° C. and 50% RH with the number of revolution varied from 300 rpm to 4000 rpm, and the resultant layer was annealed for 2 hours at room temperature to form a recording layer on the light reflecting layer. An adhesive cover sheet prepared in the following manner was laminated on thus formed recording layer to obtain a sample (optical information recording medium). A heating temperature at the time of lamination was 23° C.

Preparation of Adhesive Cover Sheet

An adhesive of a polyacryl ester crosslinked with sulfur was dissolved in toluene, and the resultant solution was applied to a cellulose triacetate sheet (cover sheet) with a die coater, and the resultant sheet was made to pass through a 5 m drying zone of 60° C. at a speed of 1 m/s to evaporate the solvent, whereby an adhesive cover sheet having a total thickness of 0.1 mm was obtained.

Example 2

A sample (optical information recording medium) was prepared in a similar manner as in the example 1, except that the adhesive cover sheet was prepared in a following manner.

Preparation of Adhesive Cover Sheet

A polyacryl ester adhesive was dissolved in toluene, and the resultant solution was applied to a releasing paper, and the resultant sheet was made to pass through a 5 m drying zone of 60° C. at a speed of 1 m/s to evaporate the solvent. Its adhesive layer was transferred from the sheet onto a roller, and transferred therefrom to a cellulose triacetate sheet to obtain an adhesive cover sheet having a total thickness of 0.1 mm. The transfer was performed at 23° C. and at a speed of 0.5 m/s.

Example 3

A sample (optical information recording medium) was prepared in a similar manner as in the example 1, except that the adhesive cover sheet was prepared in a following manner.

Preparation of Adhesive Cover Sheet

A polyacryl ester adhesive was dissolved in toluene, and the resultant solution was applied to a releasing paper, and the resultant sheet was made to pass through a 5 m drying zone of 60° C. at a speed of 1 m/s to evaporate the solvent. Its adhesive layer was transferred from the sheet onto a roller, and transferred therefrom to a polycarbonate sheet to obtain an adhesive cover sheet having a total thickness of 0.1 mm.

Comparative Example 1

A sample (optical information recording medium) was prepared in a similar manner as in the example 1, except that the adhesive cover sheet was prepared in a following manner.

Preparation of Adhesive Cover Sheet

A rubber adhesive was dissolved in toluene, and the resultant solution was applied to a cellulose triacetate film. The resultant sheet was made to pass through a 5 m drying zone of 60° C. at a speed of 1 m/s to evaporate the solvent and an adhesive cover sheet having a total thickness of 0.1 mm was thus obtained.

Evaluation of Optical Information Recording Medium

Recording/Reproducing Test

A 3T signal was recorded on each of the optical information recording media obtained in Examples 1 to 3 and Comparative Example 1 at a power of 6 mW by a unit DDU-1000 (manufactured by Pulsetech Co., Ltd.) equipped with a laser having an osillution wavelength of 405 nm and a numerical aperture of 0.85, and a C/N (carrier-to-noise) ratio was measured. Results are shown in Table 1.

TABLE 1

|  | C/N |
| --- | --- |
| Example 1 | 42 |
| Example 2 | 50 |
| Example 3 | 51 |
| Comparative Example 1 | 15 |

Results in Table 1 indicate that the Examples 1 to 3 utilizing the acrylic adhesive showed a C/N ratio of 40 or higher, representing satisfactory recording characteristics. Particularly the Examples 2 and 3 utilizing the transfer method showed a C/N ratio of 50 or higher, representing even better recording characteristics.

On the other hand, the Comparative Example 1 utilizing a rubber adhesive showed a C/N ratio of 15 and was incapable of providing satisfactory recording characteristics.

What is claimed is:

1. An optical information recording medium, for use with a laser irradiating a laser beam having a wavelength of 380 to 500 nm through an objective lens with a numerical aperture of at least 0.7, the optical information recording medium comprising, in the following order: a substrate; a recording layer; a layer of acrylic adhesive; and a cover layer; wherein said acrylic adhesive includes an acrylic polymer having a glass transition point of no more than 0° C.

2. An optical information recording medium according to claim 1, wherein said acrylic adhesive includes a crosslinking agent.

3. An optical information recording medium according to claim 1, wherein the layer of acrylic adhesive has a thickness of from 1 to 1000 μm.

4. An optical information recording medium according to claim 1, further comprising a light reflecting layer between said substrate and said recording layer.

5. An optical information recording medium according to claim 4, further comprising an undercoat layer between said substrate and said light reflecting layer.

6. An optical information recording medium according to claim 1, wherein said recording layer includes a dye.

7. An optical information recording medium according to claim 1, wherein said cover layer is selected from polycarbonate, cellulose triacetate and acrylic polymers.

8. An optical information recording medium according to claim 1, wherein the layer of acrylic adhesive has a thickness of from 5 to 500 μm.

9. An optical information recording medium according to claim 1, wherein the layer of acrylic adhesive has a thickness of from 10 to 100 μm.

10. An optical information recording medium, for use with a laser irradiating a laser beam having a wavelength of 380 to 500 nm through an objective lens with a numerical aperture of at least 0.7, the optical information recording medium comprising, in the following order: a substrate; a recording layer; and a cover layer formed by an acrylic adhesive, wherein the acrylic adhesive material has an acrylic polymer having a glass transition point of no more than 0° C.

11. An optical information recording medium according to claim 10, wherein said acrylic adhesive includes a crosslinking agent.

12. An optical information recording medium according to claim 10, wherein the cover layer formed by said acrylic adhesive has a thickness of from 1 to 1000 μm.

13. An optical information recording medium according to claim 10, further comprising a light reflecting layer between said substrate and said recording layer.

14. An optical information recording medium according to claim 13, further comprising an undercoat layer between said substrate and said light reflecting layer.

15. An optical information recording medium according to claim 10, wherein said recording layer includes a dye.

16. An optical information recording medium according to claim 10, wherein the cover layer formed by said acrylic adhesive has a thickness of from 5 to 500 μm.

17. An optical information recording medium according to claim 10, wherein the cover layer formed by said acrylic adhesive has a thickness of from 10 to 100 μm.

* * * * *